United States Patent
Zuo

(10) Patent No.: US 8,186,726 B2
(45) Date of Patent: May 29, 2012

(54) LATCHING MECHANISM AND ELECTRONIC DEVICE USING THE SAME

(75) Inventor: Zhou-Quan Zuo, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 305 days.

(21) Appl. No.: 12/471,554

(22) Filed: May 26, 2009

(65) Prior Publication Data

US 2010/0264671 A1    Oct. 21, 2010

(30) Foreign Application Priority Data

Apr. 21, 2009  (CN) .......................... 2009 1 0301728

(51) Int. Cl.
*E05C 5/02* (2006.01)
*E05C 19/00* (2006.01)

(52) U.S. Cl. 292/57; 292/1; 292/DIG. 11; 292/DIG. 38; 292/DIG. 53; 403/353

(58) Field of Classification Search .............. 292/1, 57, 292/DIG. 11, DIG. 38, DIG. 53; 403/353
See application file for complete search history.

(56) References Cited

U.S. PATENT DOCUMENTS

| | | | | |
|---|---|---|---|---|
| 1,520,520 A * | 12/1924 | Thomason | ................ | 108/153.1 |
| 2,497,804 A * | 2/1950 | Stearns | .......................... | 439/18 |
| 3,894,377 A * | 7/1975 | Welch | .......................... | 52/584.1 |
| 4,135,837 A * | 1/1979 | Suttles | ......................... | 403/245 |
| 5,331,506 A * | 7/1994 | Nakajima | ............... | 361/679.58 |
| 5,716,154 A * | 2/1998 | Miller et al. | .................... | 403/22 |
| 6,788,531 B2 * | 9/2004 | Chen | ....................... | 361/679.31 |
| 7,260,872 B2 * | 8/2007 | Schultz | ............................ | 27/10 |
| 7,698,792 B1 * | 4/2010 | Parker | ............................. | 27/10 |
| 7,742,294 B2 * | 6/2010 | Gadau et al. | ............. | 361/679.43 |
| 2009/0322191 A1 * | 12/2009 | Chang et al. | .............. | 312/223.1 |

* cited by examiner

*Primary Examiner* — Carlos Lugo
(74) *Attorney, Agent, or Firm* — Altis Law Group, Inc.

(57) ABSTRACT

A latching mechanism to connect a cover to a housing includes a catch and a catching portion. The catch is disposed on the cover. The catch includes a latching end and a connecting portion. The catching portion is defined in the housing. The catching portion includes a first hole and a second hole communicating with each other. The first hole is larger than or substantially equal to the diameter of the latching end, the second hole is larger than the connecting portion and smaller than the latching end, and a joint of the first hole and second hole is smaller than the diameter of the connecting portion. The present disclosure further provides an electronic device including the latching mechanism.

1 Claim, 2 Drawing Sheets

LATCHING MECHANISM AND ELECTRONIC DEVICE USING THE SAME

BACKGROUND

1. Technical Field

The present invention generally relates to latching mechanisms and electronic devices; and particularly to a latching mechanism for connecting a cover to a housing of an electronic device.

2. Description of Related Art

With the development of wireless communication and information processing technologies, electronic devices such as mobile phones, personal digital assistants (PDAs) and digital cameras are now in widely used, and consumers may now enjoy the full convenience of high technology products almost anytime and anywhere. The electronic device generally includes interfaces, for example, charge interfaces, universal serial bus (USB) interfaces, earphone interfaces. The interfaces are usually open the environment, thus dust and particles may accumulate in the interfaces, subjecting the interfaces to damage by from external objects and substances. Therefore, a cover is needed to cover each interface.

A typical electronic device includes a housing and a cover to cover an interface. The housing defines a slot to receive the cover, a latching hole communicating with the slot, and a receiving slot larger than the latching hole. The cover includes a latching end to extend through the latching hole and engage in the receiving slot, thus connecting the cover to the housing. A step end connecting the latching hole and the receiving slot resists the latching end to stop the latching end from falling off from the housing. When the interface needs to be used, e.g., connected to an earphone or a data cable, the cover is rotated away from the interface around the latching end.

However, in order to retain the cover from falling off the housing, the latching end of the cover has a size larger than the latching hole. When assembling the cover to the housing, the latching end should be squeezed into and through the latching hole. Thus, assembling the cover to the housing is complex, and the cover and housing may be damaged because of large force to squeeze the latching end.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
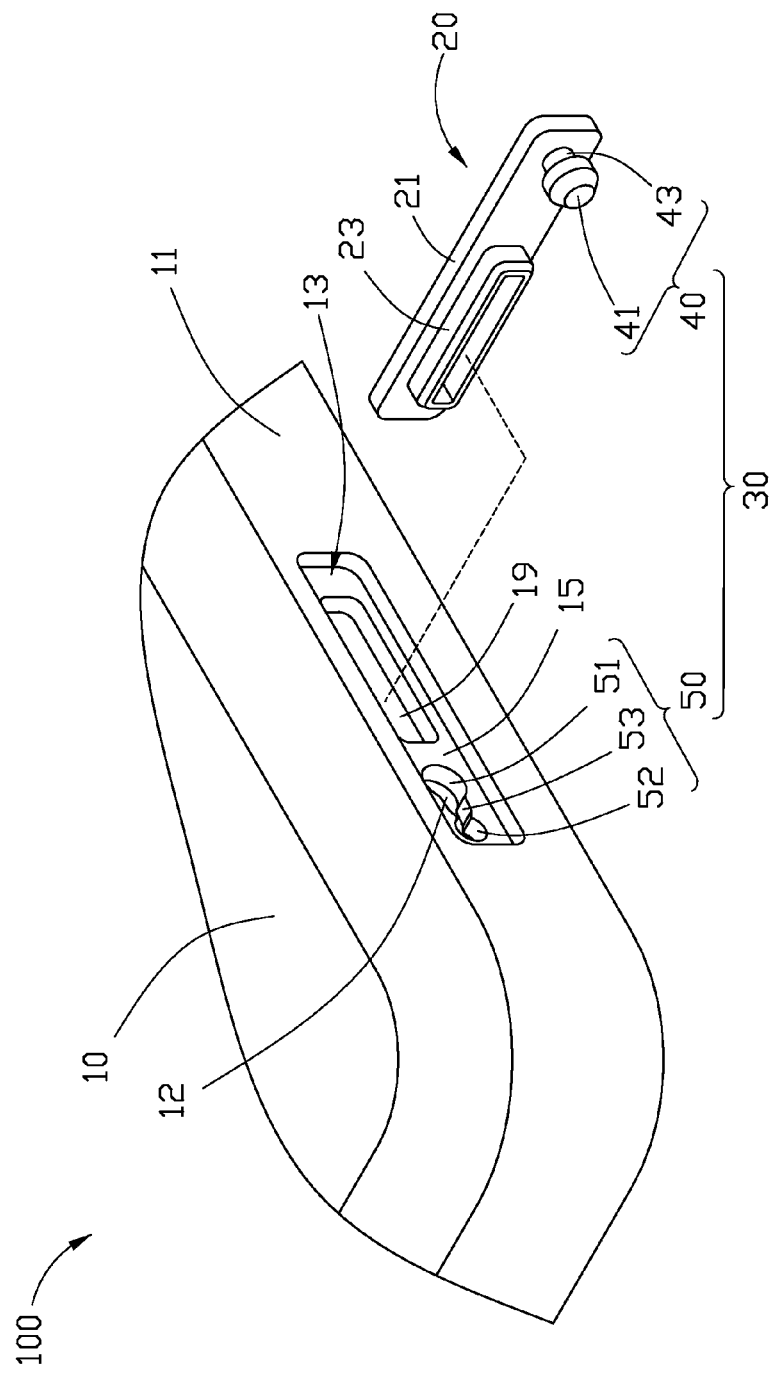
FIG. 1 is a partial, exploded, perspective view of one embodiment of an electronic device including a housing and a cover.

Referring to FIG. 1, an embodiment of an electronic device 100 is shown. In the illustrated embodiment, the electronic device 100 is a mobile phone. The electronic device includes a housing 10, a cover 20, and a latching mechanism 30 to connect the cover 20 with the housing 10. Then latching mechanism 30 includes a catch 40 formed on the cover 20 and a catching portion 50 defined in the housing 10.

The cover 20 includes a covering portion 21, a protrusion 23, and the catch 40. The catch 40 is formed at an end of the covering portion 21, and includes a latching end 41 and a connecting portion 43. The latching end 41 has a cross-section larger than the connecting portion 43, and the connecting portion 43 is disposed between the covering portion 21 and the latching end 41. In the illustrate embodiment, the catch 40 is elastic and made of thermoplastic urethane (TPU). The catch 40 may be an independent member fixed to the covering portion 21.

The housing 10 includes a sidewall 11 and defines a cavity 12. The sidewall 11 defines a slot 13 for receiving the covering portion 21 of the cover 20. A bottom wall 15 is formed between the cavity 12 and the slot 13. The bottom wall 15 defines the catching portion 50 and an opening 19 spaced from the catching portion 50. The catching portion 50 and the opening 19 are communicating with the slot 13 and the cavity 12. The opening 19 has a size and shape corresponding to the protrusion 23. The opening 19 is configured to allow an interface plug (not shown) to expose to outside.

The catching portion 50 includes a first hole 51, a second hole 52, and a connecting hole 53 between and communicating with the first hole 51 and the second hole 52. The first hole 51 has a diameter larger than or substantially equal to the diameter of the latching end 41, the connecting hole 53 has a diameter slightly smaller than the diameter of the connecting portion 43. The second hole 52 has a diameter larger than the diameter of the connecting portion 43 and smaller than the diameter of the latching end 41. To ensure the catch 40 steadily rotates in the second hole 52, the diameter of the second hole 52 is preferred to be slightly larger than the diameter of the connecting portion 43. Alternatively, the diameter of the second hole 52 may equal to or even be smaller than the diameter of the connecting portion 43, so long as the catch 40 can rotate in the second hole 52. A diameter of the connecting hole 53 gradually decreases along a direction from the first hole 51 to the second hole 52.

Figure 2:
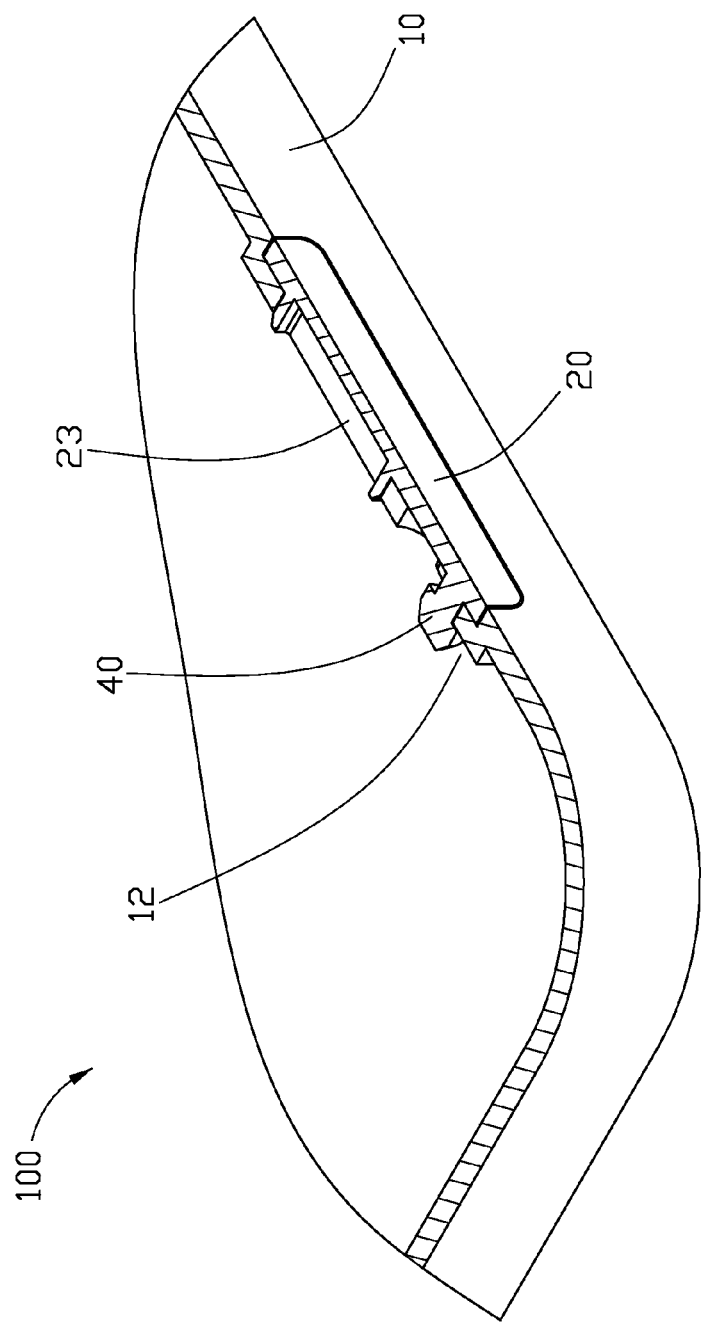
FIG. 2 is a partial, assembled, cut-away view of the electronic device of FIG. 1.

Referring to FIG. 2, to assemble the cover 20 to the housing 10, the catch 40 extends in the first hole 51 of the catching portion 50 to make the latching end 41 extend in the cavity 12 of the housing 10 and the connecting portion 43 extends in the first hole 51. The cover 20 is pushed to slide in the catching portion 50 until the connecting portion 43 slides into the second hole 52. In this state, the catch 40 cannot fall off from the housing 10 via the second hole 52 because the second hole 52 is smaller than the latching end 41, and the catch 40 cannot slide into the first hole 51 because the connecting hole 53 is smaller than the connecting portion 43. The protrusion 23 of the cover 20 is pressed into the opening 19 of the housing 10. Thus, the covering portion 21 covers the slot 13 and the cover 20 is connected to the housing 10.

When the plug in the opening 19 needs to be used, the cover 20 is pulled to force the protrusion 23 disengaging from the opening 19 and rotated about the catch 40 through an appropriate angle. As such, the plug in the opening 19 is exposed.

The cover 20 can be assembled to the housing 10 by inserting the catch 40 in the first hole 51 and then sliding the cover 20 into the second hole 52. The operation is very easy and convenient because the first hole 51 is larger than the cross-section of the latching end 41 and the connecting portion 43. When the cover 20 is damaged, it is also very easy and convenient to change the cover 20 with another one.

In alternative embodiments, the second hole 52 may be not smaller than the cross-section of the latching end 41 of the cover 40, so long as a dimension between two farthest points on a periphery of the second hole 52 is smaller than a dimension between two farthest points of the latching end 41. That is, relationship of the second hole 52 and the latching end 41 prevents the catch 40 from falling off from the housing 10 via the second hole 52. The connecting hole 53 may be omitted and the first hole 51 communicates and connects with the second hole 52. In this case, a joint of the first hole 51 and the second hole 52 is smaller than the second hole 52. The bottom wall 15 may be elastic rather than the catch 40 being elastic.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device, comprising:
a housing defining a catching portion and an opening, the catching portion including a first hole, a second hole and a connecting hole between and communicating with the first hole and the second hole, the connecting hole being smaller than the diameter of the first hole and the second hole, the opening for exposing an interface plug;
a cover comprising a covering portion, a protrusion and a catch, the catch and the protrusion formed on the covering portion, the covering portion for interacting with the opening to selectively hide the interface plug; and
wherein when the catch is positioned in the first hole, and is elastically pushed to slide to the second hole through the connecting hole, the connecting hole prevents the catch into the first hole for maintaining the cover attached to the housing;
wherein to close the opening, the cover is rotated to a position wherein the protrusion is align with the opening and the cover is pushed so that the protrusion is received into and engaged with the opening to allow the cover to hide the interface plug;
wherein to expose the opening, the cover is forced to disengage the protrusion from the opening, and the cover is rotated around the catch to expose the opening.

\* \* \* \* \*